(12) United States Patent
Shin et al.

(10) Patent No.: US 11,562,553 B2
(45) Date of Patent: Jan. 24, 2023

(54) METHOD, APPARATUS, AND COMPUTER PROGRAM FOR DETECTING ABUSING ACT IN ONLINE SERVICE

(71) Applicant: NAVER Corporation, Seongnam-si (KR)

(72) Inventors: Boram Shin, Seongnam-si (KR); Won Gu Nam, Seongnam-si (KR); Sungwon Jung, Seongnam-si (KR); Hyungseok Park, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 325 days.

(21) Appl. No.: 16/727,238

(22) Filed: Dec. 26, 2019

(65) Prior Publication Data
US 2020/0210752 A1   Jul. 2, 2020

(30) Foreign Application Priority Data

Dec. 28, 2018 (KR) ........................ 10-2018-0172711

(51) Int. Cl.
*G06V 10/75* (2022.01)
*G06N 3/08* (2006.01)
*H04L 9/40* (2022.01)

(52) U.S. Cl.
CPC ............ *G06V 10/751* (2022.01); *G06N 3/08* (2013.01); *H04L 63/20* (2013.01)

(58) Field of Classification Search
CPC .................................. G06N 3/08; H04L 63/20
See application file for complete search history.

(56) References Cited

U.S. PATENT DOCUMENTS

2008/0126159 A1* 5/2008 Wee ...................... G06Q 30/00
                                                          705/7.33
2009/0287685 A1* 11/2009 Charnock ............... G06F 16/38
(Continued)

FOREIGN PATENT DOCUMENTS

JP    2005222216 A    8/2005
JP    2008135030 A    6/2008
(Continued)

OTHER PUBLICATIONS

X. Wang, Q. Tan, J. Shi, S. Su and M. Wang, "Insider Threat Detection Using Characterizing User Behavior," 2018 IEEE Third International Conference on Data Science in Cyberspace (DSC), 2018, pp. 476-482, doi: 10.1109/DSC.2018.00077. (Year: 2018).*
(Continued)

*Primary Examiner* — Chau Le
(74) *Attorney, Agent, or Firm* — Greer Burns & Crain Ltd.

(57) ABSTRACT

The present invention discloses a method of detecting an abusing act in an online service, the method including: a use act information collecting operation in which an apparatus for detecting an abusing act collects use act information including the kinds and an order of one or more use acts performed by a user; an image configuring operation in which the kinds of the one or more use acts performed by the user are arranged in a time order and an image is configured by setting the kinds of predetermined use acts to a first axis and setting the order of the use acts to a second axis; and an abusing act detecting operation in which whether the use act of the user is an abusing act is detected by using the image.

12 Claims, 18 Drawing Sheets

(56) References Cited

U.S. PATENT DOCUMENTS

| | | | |
|---|---|---|---|
| 2015/0302466 A1* | 10/2015 | Huang | G06F 16/9577 |
| | | | 705/14.45 |
| 2017/0134415 A1* | 5/2017 | Muddu | H04L 43/062 |
| 2019/0132344 A1* | 5/2019 | Lem | G06N 5/003 |
| 2019/0392273 A1 | 12/2019 | Shigeta | |
| 2020/0186546 A1* | 6/2020 | Dichiu | G06F 21/554 |

FOREIGN PATENT DOCUMENTS

| | | | |
|---|---|---|---|
| JP | 2018130183 A | 8/2018 | |
| KR | 20080048185 A | 6/2008 | |
| KR | 10-2009-0043629 A | 5/2009 | |
| KR | 20170104931 A | 9/2017 | |
| WO | 2012020758 A1 | 2/2012 | |
| WO | 2017172782 A1 | 10/2017 | |

OTHER PUBLICATIONS

Office action issued in corresponding Korean patent application No. 10-2018-0172711, dated Jan. 28, 2020.

Office Action issued in corresponding Japanese application No. 2019-237635, dated Oct. 20, 2020.

\* cited by examiner

FIG. 1

FIG. 4
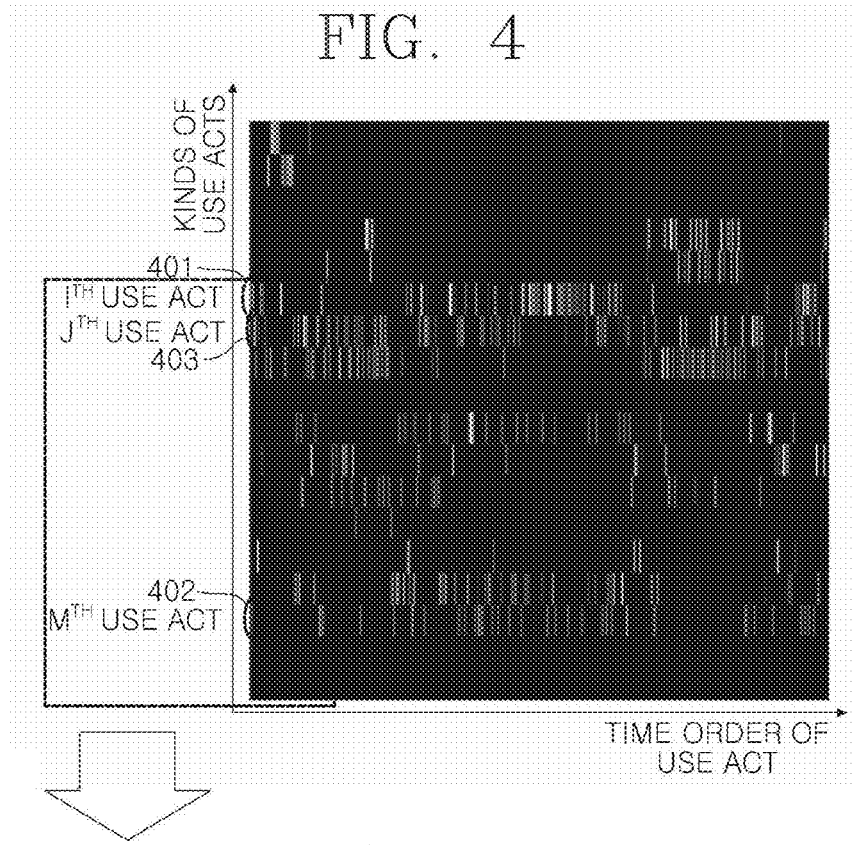
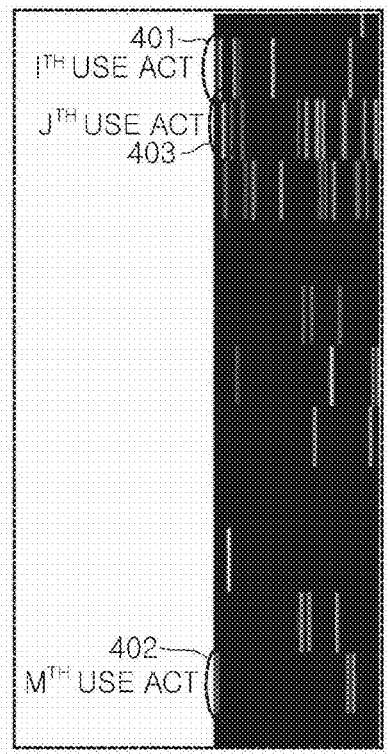

FIG. 5

| Y-AXIS COORDINATE | KINDS OF USE ACTS |
|---|---|
| 1 | POST LOOKUP |
| 2 | SEARCH |
| 3 | PICTURE DETAILS |
| 4 | VIDEO PLAYBACK |
| 5 | SCHEDULE DETAILS |
| 6 | CREATE/DELETE/CORRECT CAFE |
| 7 | SET/CORRECT PROFILE |
| 8 | JOIN/LEAVE CAFE |
| 9 | CREATE/DELETE INVITATION |
| 10 | CREATE/CORRECT/DELETE/SHARE POST |
| 11 | CREATE PICTURE/CHANGE ALBUM/DELETE PICTURE |
| 12 | RECEIVE INVITATION |
| 13 | POST COMMENT |
| 14 | CREATE CHATTING TEXT |
| 15 | REPORT SOMEONE |
| 16 | CREATE EMOTION |
| 17 | INVITE TO/CREATE CHAT WINDOW |
| 18 | CREATE/DELETE FILE |
| 19 | CREATE/DELETE BOOKMARK |
| 20 | CREATE URL CHAT |
| 21 | REPORT USER |
| 22 | ACCESS CAFE LIST |
| 23 | ACCESS CAFE HOME |
| 24 | ACCESS NEWS |
| 25 | ACCESS SCHEDULE TAB |
| 26 | ACCESS ALBUM |
| 27 | ACCESS MEMBER LIST |
| 28 | ACCESS PEED |
| 29 | ACCESS WRITING MAIN SCREEN |
| 30 | ACCESS CHAT ROOM |

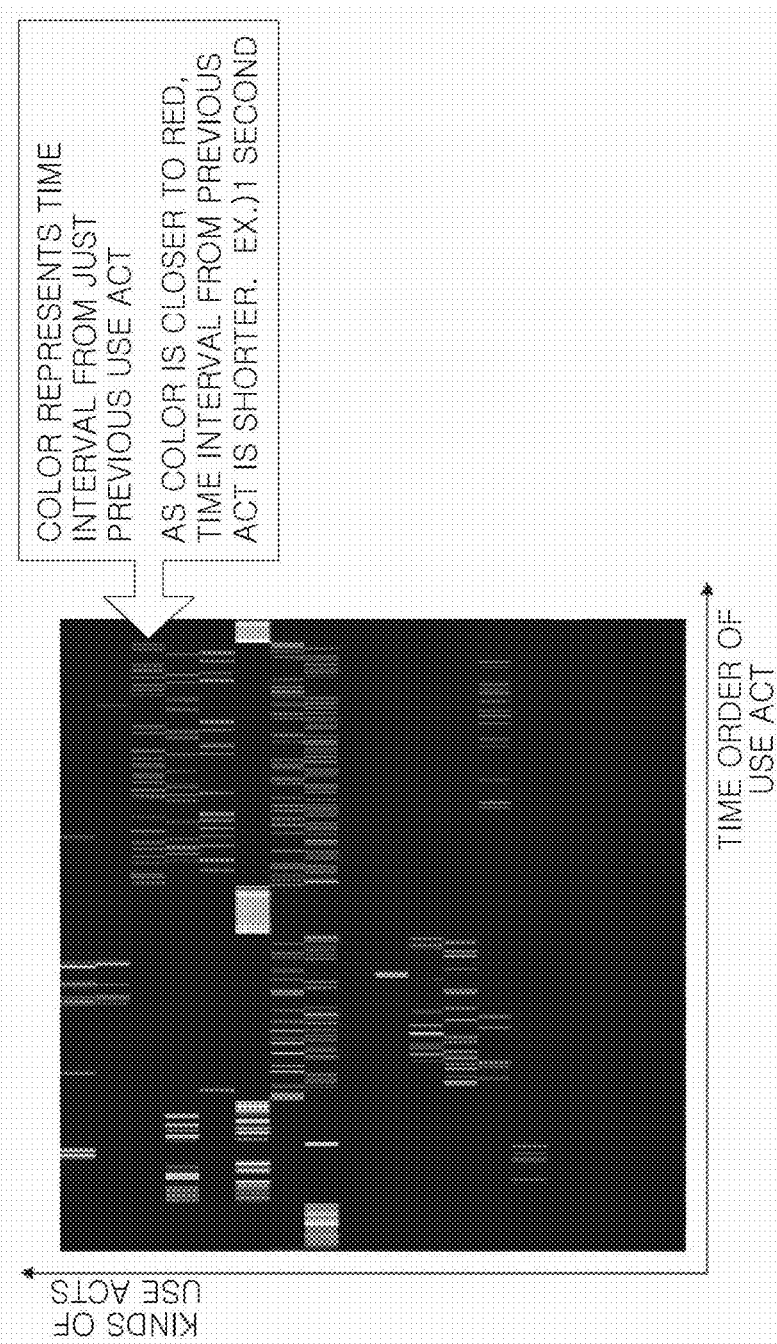

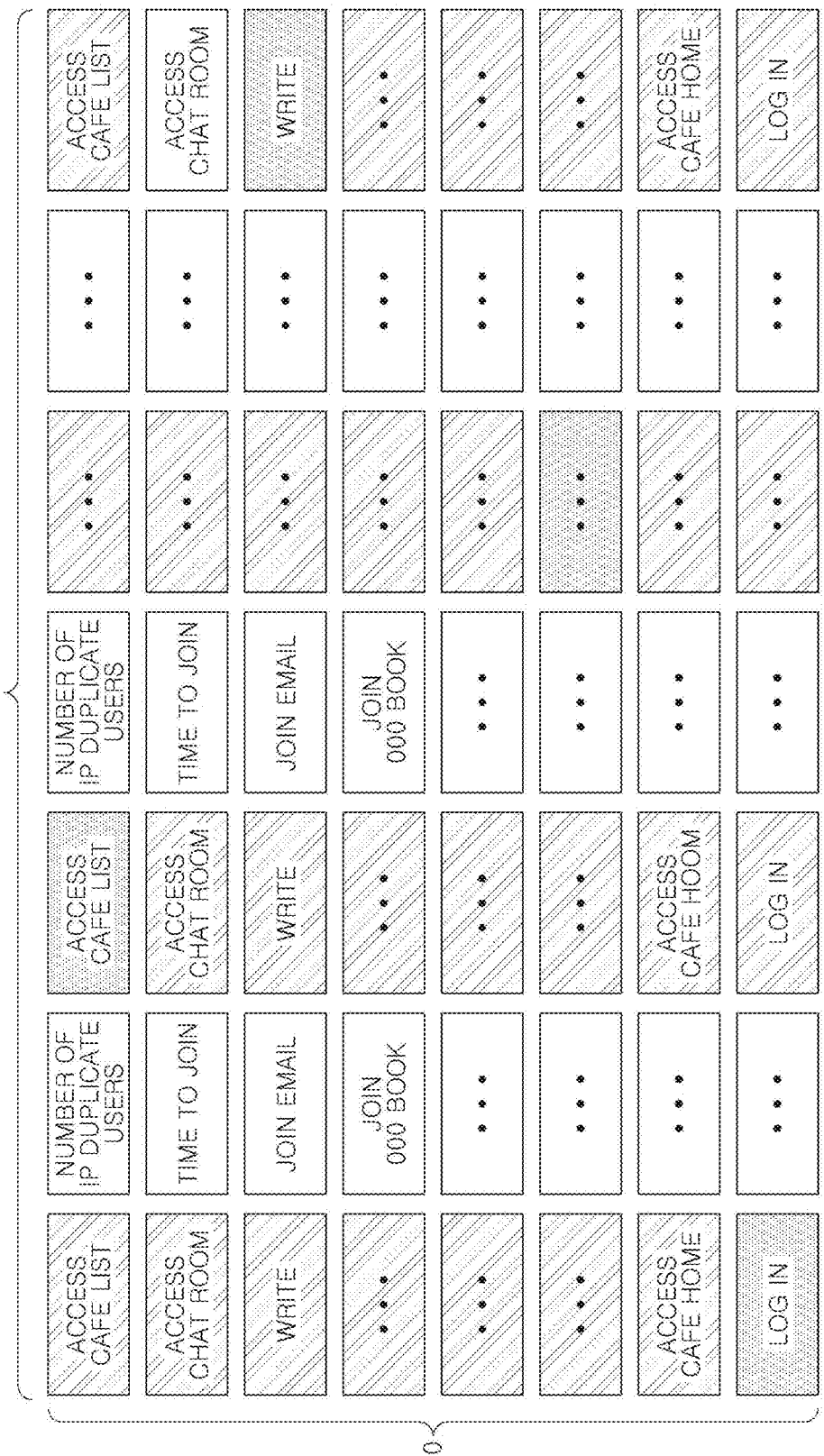

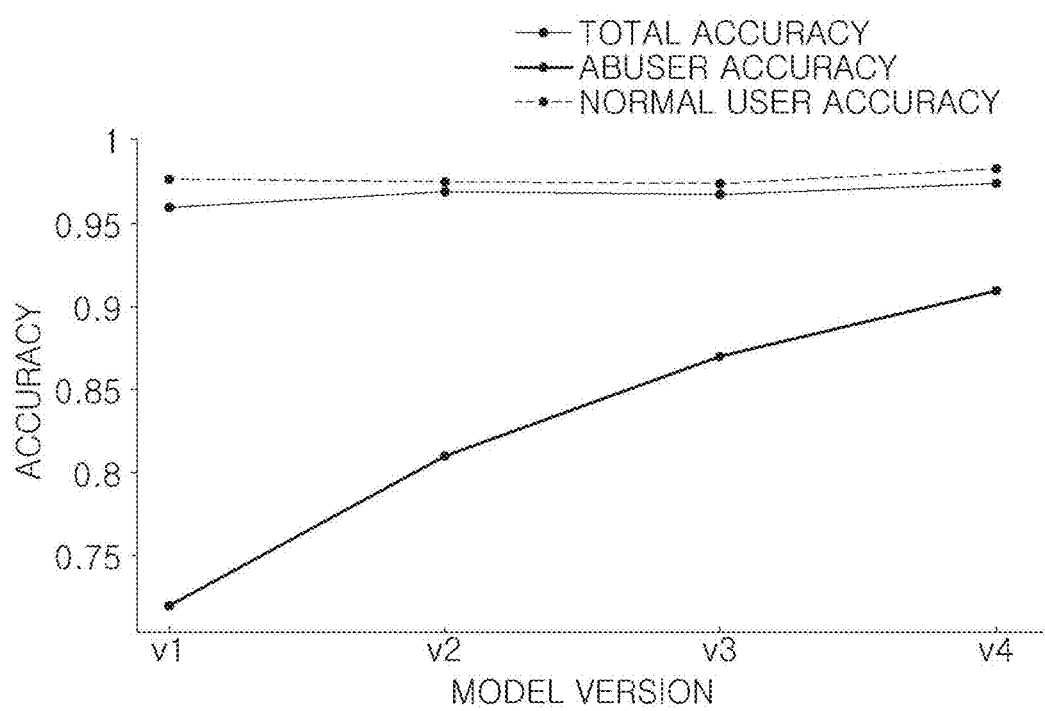

METHOD, APPARATUS, AND COMPUTER PROGRAM FOR DETECTING ABUSING ACT IN ONLINE SERVICE

CROSS-REFERENCE TO RELATED APPLICATIONS

This application claims priority to and the benefit of Korean Patent Application No. 10-2018-0172711 filed in the Korean Intellectual Property Office on Dec. 28, 2018, the entire contents of which are incorporated herein by reference.

BACKGROUND OF THE INVENTION

Field of Invention

The present invention relates to a method, an apparatus, and a computer program for detecting an abusing act in an online service, and more particularly, to a method, an apparatus, and a computer program for detecting an abusing act in an online service, which form the kinds and an order of acts performed by a user using an online service in a pattern to form an image, analyze the image, and then determine whether the act of the user is abnormal, thereby more accurately and effectively detecting an abusing act of the user.

Description of Related Art

Along with the development of information and communication technology, various online services, in which a user accesses a social network (SNS), a portal site, and the like and posts a message or sends an e-mail by using various terminals, such as a smart phone or a personal computer (PC), are broadened.

However, unlike general normal users, abusing acts, such as accessing a social network or a café of a portal site online, posting an article (see FIG. 1) for the purpose of advertising, which is completely irrelevant to the purpose of the social network, the café, or the like or sending an advertisement through an e-mail, of some users are rapidly increasing, and thus creation of various technologies for detecting and restricting abusing acts have been attempted.

However, in the related art, in order to detect the abusing acts of users in general, an abusing act is detected by analyzing fragmental information or a specific act of a user. For example, the abusing act is detected by using log-in information, an IP address, or the like of a user or analyzing text of a written document by using machine learning, and further, the abusing act is detected by analyzing an image, a URL, and the like included in a document written by a user.

However, there are many cases where it is not easy to distinguish the abusing act from a normal use act through the related art, so that accuracy in detecting the abusing act is low, and further there is a problem in that a user can relatively easily avoid the detection of the abusing act.

When considering the recent use of online services by users, it is not just to simply detect an abusing act of a specific user, but also to effectively detect abusing acts by analyzing the use acts frequently performed by tens of millions or more users, so the detection of abusing acts is a more difficult issue.

Accordingly, a demand for a method of accurately and effectively detecting an abusing act of a user is continued, but an appropriate solution for the demand has not been provided.

RELATED ART LITERATURE

Patent Document

Korean Patent Application Laid-Open No. 10-2009-0043629 (published on May 7, 2009)

BRIEF SUMMARY OF THE INVENTION

The present invention is conceived to solve the problems in the related art, and an object of the present invention is to provide a method, an apparatus, and a computer program for detecting an abusing act in an online service, which are capable of more accurately and effectively detecting an abusing act of an online service user.

Other detailed objects of the present invention will be apparently recognized and understood by those skilled in the technical field of the present invention through the particular contents described below.

In order to solve the problem, a method of detecting an abusing act of a user using an online service according to an aspect of the present invention includes: a use act information collecting operation in which an apparatus for detecting an abusing act collects use act information including the kinds and an order of one or more use acts performed by a user; an image configuring operation in which the kinds of the one or more use acts performed by the user are arranged in a time order and an image is configured by setting the kinds (N kinds) of predetermined use acts to a first axis and setting the order of the use acts to a second axis; and an abusing act detecting operation in which whether the use act of the user is an abusing act is detected by using the image.

A computer program according to another aspect of the present invention is a computer program which is combined with hardware to execute each operation of the method of detecting the abusing act in the online service.

An apparatus for detecting an abusing act of a user using an online service according to another aspect of the present invention includes: a use act information collecting unit configured to collect use act information including the kinds and an order of one or more use acts performed by a user in a terminal; an image configuring unit configured to arrange the kinds of the one or more use acts performed by the user in a time order and configure an image by setting the kinds (N kinds) of predetermined use acts to a first axis and setting the order of the use acts to a second axis; and an abusing act detecting unit configured to detect whether the use act of the user is an abusing act by using the image.

Accordingly, the method, the apparatus, and the computer program for detecting the abusing act in the online service according to the exemplary embodiment of the present invention configure an image by forming the kinds and the order of use acts performed by a user using the online service in a pattern, analyze the image, and then determine whether the use act performed by the user is abnormal, so that it is possible to more accurately detect the abusing act of the user, and further, it is possible to effectively detect the abusing act by analyzing the use acts frequently performed by the plurality of users.

BRIEF DESCRIPTION OF THE DRAWINGS

The accompanying drawings included as a part of the detailed description for helping the understanding of the present invention provide an exemplary embodiment of the present invention and describes the technical spirit of the present invention together with the detailed description.

Figure 1:
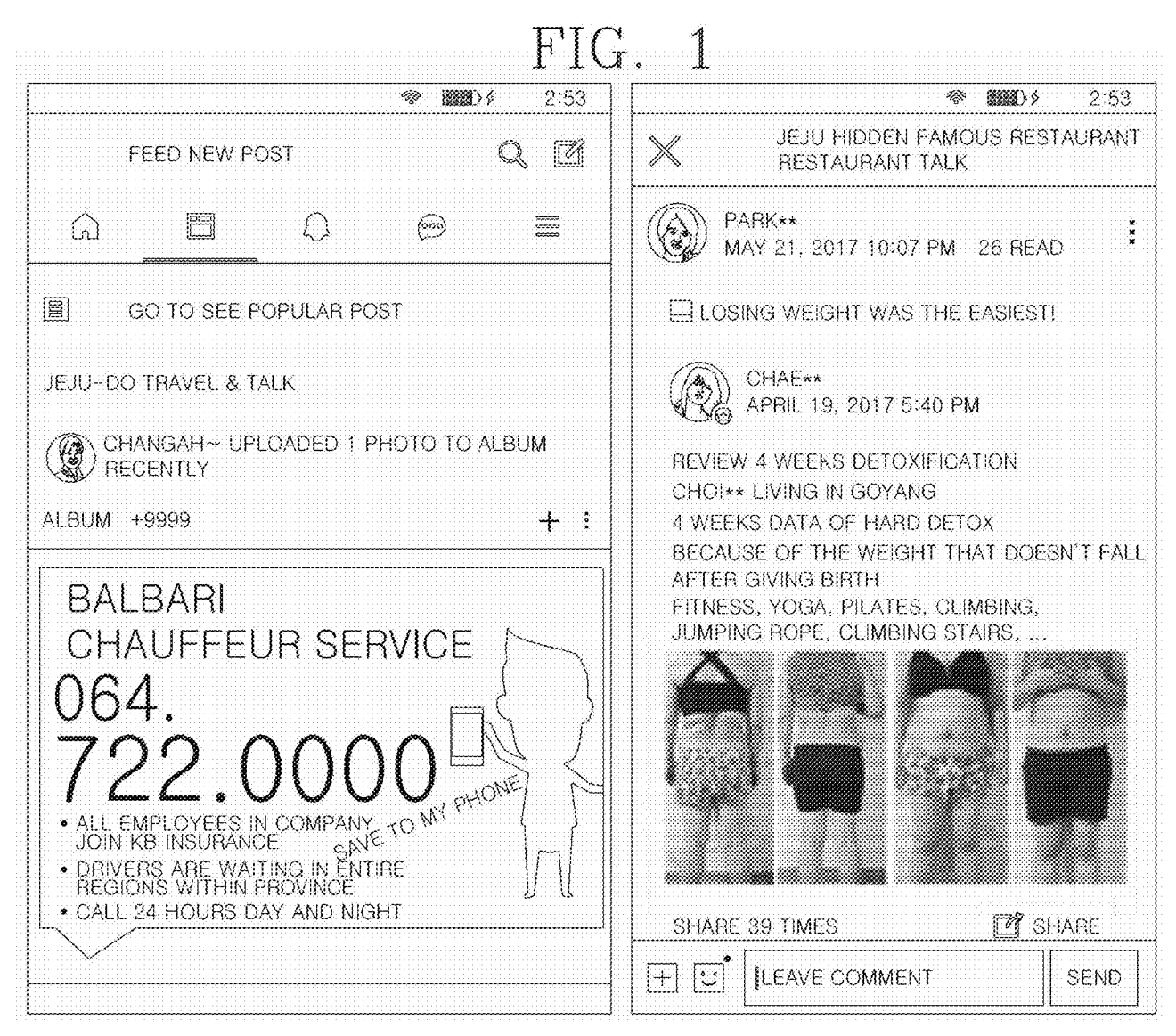

FIG. 1 is a diagram illustrating an example of a post of an abusing act of a user.

FIG. 4 is a diagram of an example of an image configured by the method of detecting the abusing act according to the exemplary embodiment of the present invention.

FIG. 5 is a diagram of an example of the kinds of use acts of a user in the method of detecting the abusing act according to the exemplary embodiment of the present invention.

FIG. 6 is a diagram of an example of an image configured for a normal use act in the method of detecting the abusing act according to the exemplary embodiment of the present invention.

FIGS. 8A, 8B, 9, 10A and 10B are diagrams illustrating an image, to which abusing relevant information of a user is added, in the method of detecting the abusing act according to the exemplary embodiment of the present invention.

FIG. 15 is a graph illustrating analysis accuracy by the method of detecting the abusing act according to the exemplary embodiment of the present invention.

DETAILED DESCRIPTION OF THE INVENTION

The present invention may be variously transformed, and have various exemplary embodiments, so that specific exemplary embodiments will be described in detail with reference to the accompanying drawings hereinafter.

The exemplary embodiment described below is provided for helping general understanding of a method, a device, and/or a system described in the present specification. However, this is simply an example, and the present invention is not limited thereto.

In the description of the exemplary embodiments of the present invention, when a detailed description of a related publicly known function or constituent element is determined to unnecessarily make the subject matter of the present invention unclear, the detailed description thereof will be omitted. Terms described below are terms set in consideration of a function in the present invention, and may be changed according to an intention of a user and an operator or a usual practice. Accordingly, the definitions thereof should be made based on the entire contents of the present specification. Terms used in the detailed description is for the purpose of describing the exemplary embodiments of the present invention, and shall not be restrictively used. Unless otherwise mentioned, a singular form includes a plural form. In the present description, the expression, such as "including" or "having" is intended to designate specific characteristics, numbers, steps, operations, elements, and a part or a combination thereof, and shall not be construed so as to exclude existence or a possibility of one or more other characteristics, numbers, steps, operations, and elements, and a part or a combination thereof in addition to the described matters.

Terms, such as a first and a second, may be used for describing various constituent elements, but the constituent elements are not limited by the terms. The terms are used only for the purpose of discriminating one constituent element from another constituent element.

Hereinafter, exemplary embodiments of a method, an apparatus, and a computer program for detecting an abusing act in an online service will be described in detail with reference to the accompanying drawings.

Figure 2:
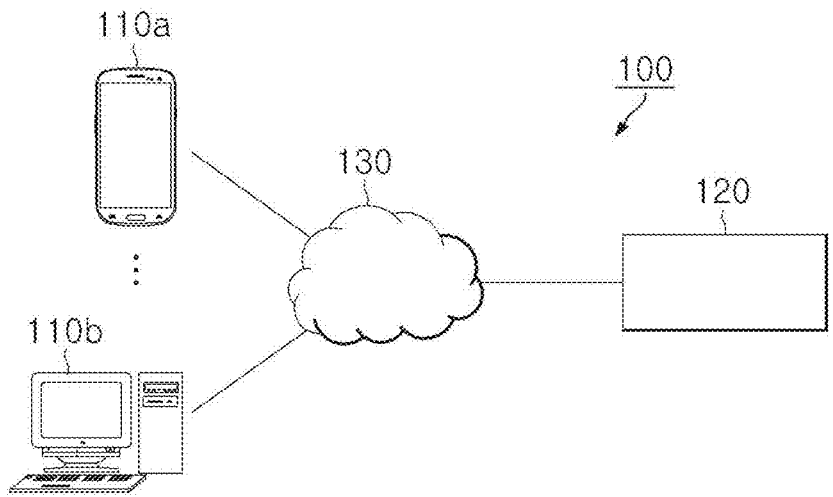
FIG. 2 is a diagram of a system for detecting an abusing act according to an exemplary embodiment of the present invention.

First, FIG. 2 is a diagram of a system 100 for detecting an abusing act in an online service according to an exemplary embodiment of the present invention. As illustrated in FIG. 2, the system 100 for detecting an abusing act in an online service according to the exemplary embodiment of the present invention may include a plurality of terminals 110a, 110b, referred collectively as a terminal 110, which transmits information about a use act performed by a user using an online service to an apparatus 120 for detecting an abusing act 120, the apparatus 120 for detecting the abusing act which forms the kinds and an order of the acts performed by the user from the terminal 110 in a pattern to configure an image, analyzes the image, and determines whether the user act is abnormal, and a network 130 which connects the terminal 110 and the apparatus 120 for detecting the abusing act.

In this case, as the terminal 110, various portable terminals, such as a smart phone, a table PC, a PDA, and a mobile phone, may be used, and in addition to this, various kinds of terminals, such as a personal computer (PC) and a notebook PC, which are capable of transmitting information about the use act performed by the user to the apparatus 120 for detecting the abusing act through the network 130, may be adopted.

The apparatus 120 for detecting the abusing act may be implemented by using one or plural computer servers, but the present invention is not essentially limited thereto, and in addition to this, the apparatus 120 for detecting the abusing act may be implemented in various forms.

In the exemplary embodiment of the present invention, the apparatus 120 for detecting the abusing act may be driven in the terminal 110 in the form of a computer program, an application (App), or the like to make an abusing act of a user be detected by the terminal 110.

The network 130 connecting the terminal 110 and the apparatus 120 for detecting the abusing act may include a wired network and a wireless network, and particularly, may include various communication networks, such as a Local Area Network (LAN), a Metropolitan Area Network (MAN), and a Wide Area Network (WAN). Further, the network 130 may also include a publicly known World Wide Web (WWW). However, the communication network 130 according to the present invention is not limited to the listed networks, and may also include a publicly known wireless data network, a publicly known telephone network, or a publicly known wire/wireless television network as at least a part of the communication network 130.

Figure 3:
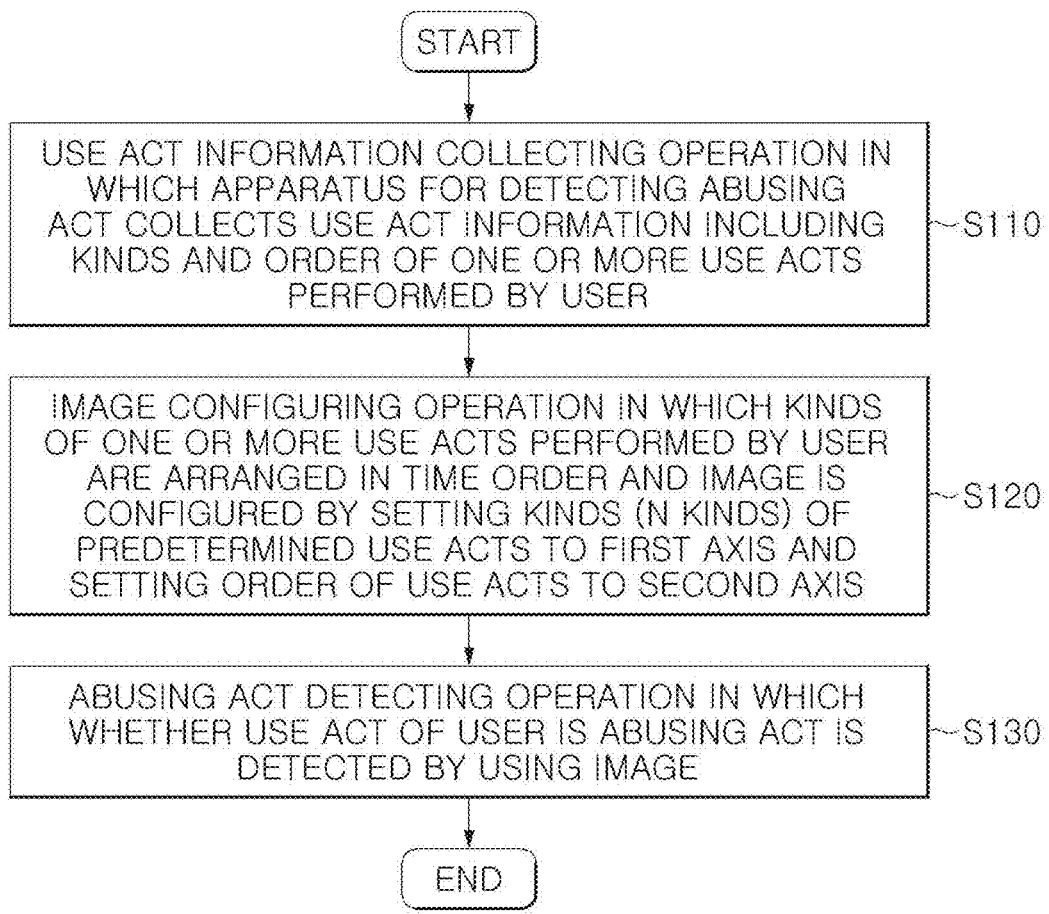
FIG. 3 is a flowchart of a method of detecting an abusing act according to an exemplary embodiment of the present invention.

FIG. 3 is a flowchart of a method of detecting an abusing act in an online service according to an exemplary embodiment of the present invention. As illustrated in FIG. 3, the method of detecting an abusing act in the online service according to the exemplary embodiment of the present invention may include collecting, by the apparatus 120 for detecting the abusing act, a use act information collecting operation S110 of collecting use act information including the kinds and an order of one or more use acts performed by a user, an image configuring operation S120 of arranging the kinds of the one or more use acts performed by the user in a time order and configuring an image by setting the kinds (N kinds) of predetermined use acts to a first axis and setting the order of the use acts to a second axis, and an abusing act detecting operation S130 of detecting whether the use act of the user is an abusing act by using the image.

The method of detecting the abusing act in the online service according to the exemplary embodiment of the present invention will be described in detail based on each operation with reference to FIGS. 2 and 3.

First, in the use act information collecting operation S110, the apparatus 120 for detecting the abusing act collects use act information including the kind and the order of one or more use acts performed by the user.

In this case, the use act includes various acts that the user performs while using the online service. For example, the use act may include joining and leaving a café, setting and correction of a profile, generation, correction, and deletion of a post, and the like.

In this regard, the abusing act means an act performed by a user for achieving a user's purpose irrelevant to the purpose of the online service while the user uses the online service, unlike normal users. For example, the abusing act may include a use act, such as accessing an online service, such as a social network or a café of a portal site, posting an article for the purpose of advertising, and the like which is completely irrelevant to the purpose (travel information sharing, famous restaurant information sharing, and the like) of the travel information social network, the famous restaurant, the café, or the like or sending an advertisement through an e-mail.

The apparatus 120 for detecting the abusing act may also receive use act information of the user generated in the terminal 110, but the present invention is not essentially limited thereto, and the apparatus 120 for detecting the abusing act may also directly generate and use the use act information of the user or may also receive the use act information of the user from another server which provides the terminal 110 with an online service, and the like.

Next, in the image configuration operation S120, the apparatus 120 for detecting the abusing act arranges the kinds or types of one or more use acts performed by the user according to a time order and configure an image by setting the kinds (N kinds) of predetermined use acts to a first axis and an order of the use act to a second axis.

More particularly, for example, FIG. 4 illustrates an example of an image configured by the method of detecting the abusing act according to the exemplary embodiment of the present invention.

As illustrated in FIG. 4, in the method of detecting the abusing act according to the exemplary embodiment of the present invention, the kinds of one or more use acts performed by the user are arranged according to a time order to configure an image by setting the kinds (for example, the generation of a post) of use acts performed by the user to the Y-axis (a first axis) and a time order of the use acts performed by the user to the X-axis (a second axis).

For example, referring to FIG. 4, it can be seen that the user first performed an ith use act (reference numeral 401 of FIG. 4), secondly performed an mth use act (reference numeral 402 of FIG. 4), thirdly performed the ith use act (reference numeral 401 of FIG. 4) again, and fourthly performed a jth use act (reference numeral 403 of FIG. 4).

As described above, in the method of detecting the abusing act according to the exemplary embodiment of the present invention, the kinds of one or more use acts performed by the user are arranged according to a time order to configure an image by setting the kinds of use acts performed by the user to the first axis and a time order of the use act performed by the user to the second axis.

FIG. 5 illustrates an example of the kinds of use acts of a user in the method of detecting the abusing act according to the exemplary embodiment of the present invention.

As illustrated in FIG. 5, the kinds of use acts of a user may include post lookup (a first use act), a search (a second use act), picture details (a third use act), a video playback (a fourth use act), and the like, and in FIG. 5, the use act is classified into 30 kinds of use acts, so that 30 kinds of use acts are allocated to the Y-axis (the first axis) of the image. However, the present invention is not limited thereto, and the kinds and the number of use acts may be appropriately adjusted in consideration of the characteristic of the online service and the like.

In the method of detecting the abusing act according to the exemplary embodiment of the present invention, the image may be configured by setting a time interval of a corresponding use act from a just or immediate previous use act to a third axis.

More particularly, as illustrated in FIG. 6, the image may be configured by forming a time interval from a just previous use act with a color of a corresponding use act.

In this case, as the time interval from a just previous use act is shorter, a color closer to a first color (for example, red) is allocated, and as the time interval from a just previous use act is longer, a color closer to a second color (for example, blue) is allocated, so that the image may include information on a time interval between the use acts.

Accordingly, in the method of detecting the abusing act according to the exemplary embodiment of the present invention, the abusing act is detected in consideration of the time interval between the use acts, so that it is possible to more accurately detect the abusing act of the user.

Figure 7A:
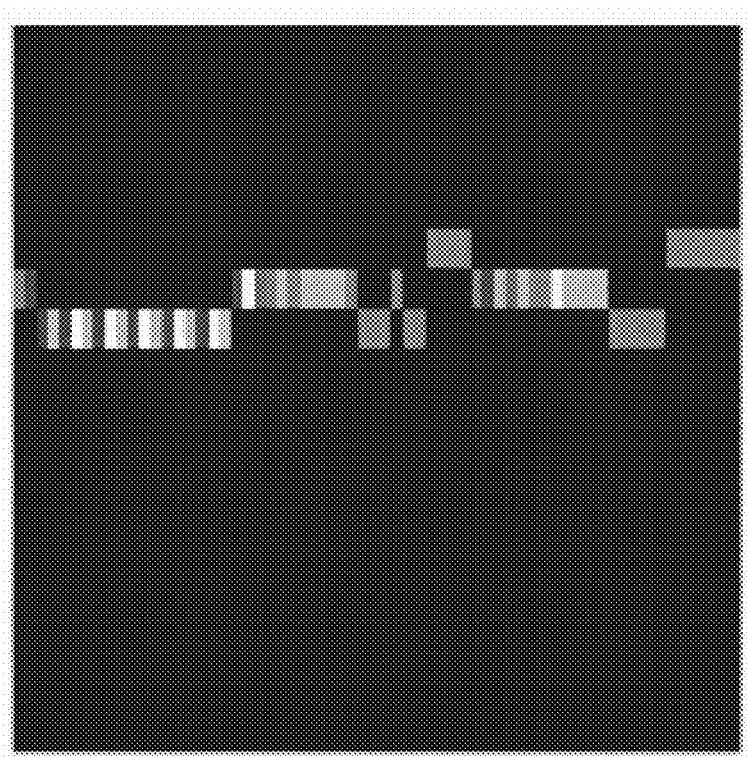
FIGS. 7A and 7B are diagrams of an example of an image configured for an abusing act in the method of detecting the abusing act according to the exemplary embodiment of the present invention.
Figure 7B:
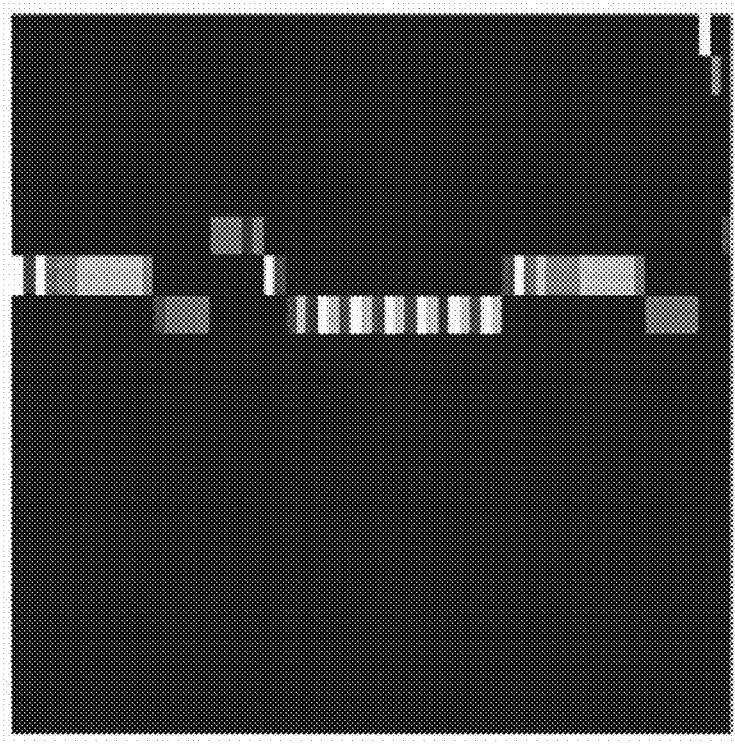

FIGS. 7A and 7B illustrate examples of an image configured for an abusing act of an abuser, such as an advertising agent, in the method of detecting the abusing act according to the exemplary embodiment of the present invention.

More particularly, an abuser, such as an advertising agent, performs a predetermined series of use act for a specific purpose, such as posting and sending advertisements, and accordingly, the abuser performs a series of use acts with a specific pattern and at a specific time interval.

There are many cases where the abuser, such as an advertising agent, automatically performs a predetermined series of use acts by using a macro program in general, so that the specific pattern and the specific time interval may be more clearly exhibited.

Accordingly, FIGS. 7A and 7B illustrate images generated for the cases where an abuser posts an advertisement and the like by using a macro program.

The image for the normal use act of FIG. 4 has considerably complex form and colors, but as illustrated in FIGS. 7A and 7B, it can be seen that the image for the abusing act has a simple form and colors according to the performance of a predetermined series of use acts for a specific purpose.

Particularly, the related art detects the abusing act by analyzing fragmental information or a specific use act of a user, such as an IP address of the user or a post written by the user, so that there is a limit in accurately detecting the abusing act, but in the method of detecting the abusing act according to the exemplary embodiment of the present invention, abnormality of an act of a user is determined by forming the kinds, an order, and a time interval of the series of use act performed by a user in an image and analyzing the image, thereby more accurately detecting an abusing act of the user.

In the method of detecting the abusing act in the online service according to the exemplary embodiment of the present invention, in the image configuration operation S120, abusing relevant information about the user may be formed in a pattern and the pattern may be added to the image.

In this case, when a first pattern (N×1 pattern) is formed from a use act of a user and the first patterns are arranged in a time order to form an image, the image may be configured by inserting a second pattern (N×1 pattern) formed from abusing relevant information about the user between some or all of the plurality of first patterns in the image.

The image may be configured by forming a third pattern (N×2 pattern) by attaching the second pattern (N×1 pattern) formed from the abusing relevant information to the first pattern (N×1 pattern) formed from the use act of the user and arranging the third patterns in the order of the use acts.

In this case, the abusing relevant information about the user refers to information considerable in determining whether the use act of the user is the abusing act. For example, the abusing relevant information about the user may include the time of joining the online service, the numerical value for the degree of overlapping usage of the terminal 110 of the user, the numerical value for the degree of overlapping usage of an IP address of the user, the numerical value for the degree of overlapping usage of a telephone number of the user, whether a mobile phone is identity-authenticated, whether an account is linked to a specific SNS, whether the joined e-mail is bad registration, and the like.

Figure 8A:
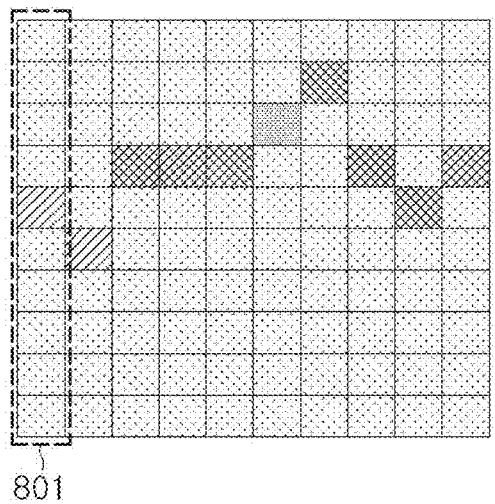
Figure 8B:
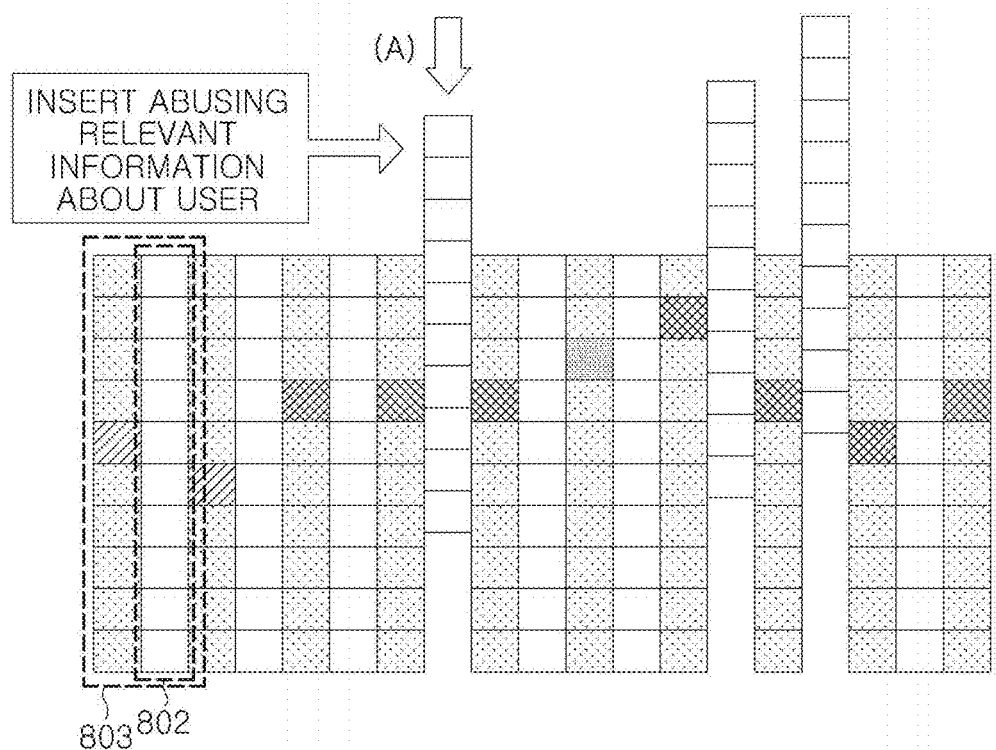

More particularly, for example, as illustrated in FIGS. 8A and 8B, when a first pattern (10×1 pattern) is formed from a use act of a user and an image is formed by arranging the first patterns in a time order (FIG. 8A), the image may be configured by inserting a second pattern (10×1 pattern) formed from abusing relevant information about the user between some or all of the plurality of first patterns in the image ((A) in FIG. 8B).

As illustrated in FIGS. 8A and 8B, the image may be configured by forming a third pattern (10×2 pattern) (reference numeral 803 of FIG. 8B) by attaching the second pattern (10×1 pattern) (reference numeral 802 of FIG. 8B) formed from the abusing relevant information to the first pattern (10×1 pattern) (reference numeral 801 of FIG. 8A) formed from the use act of the user and arranging the third pattern (reference numeral 803 of FIG. 8B) in the order of the use acts.

FIG. 9 illustrates an example of an image configured in the method of detecting the abusing act according to the exemplary embodiment of the present invention. As illustrated in FIG. 9, it can be seen that 30 kinds of use acts are allocated to the Y-axis, 100 use acts are listed according to a time order, and abusing relevant information about the user are inserted between the respective use acts, so that the image having a size of 30×200 is configured.

Figure 10A:
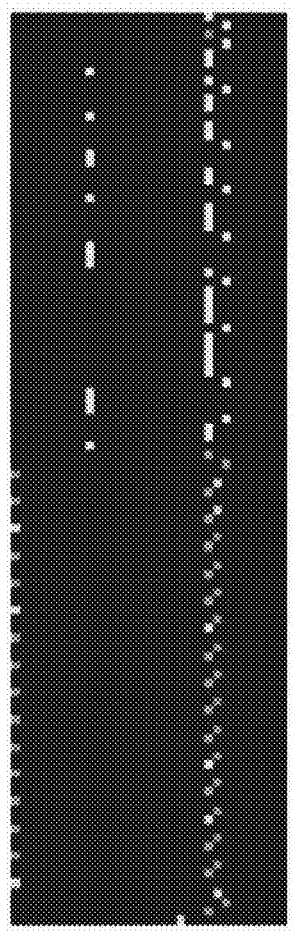
Figure 10B:
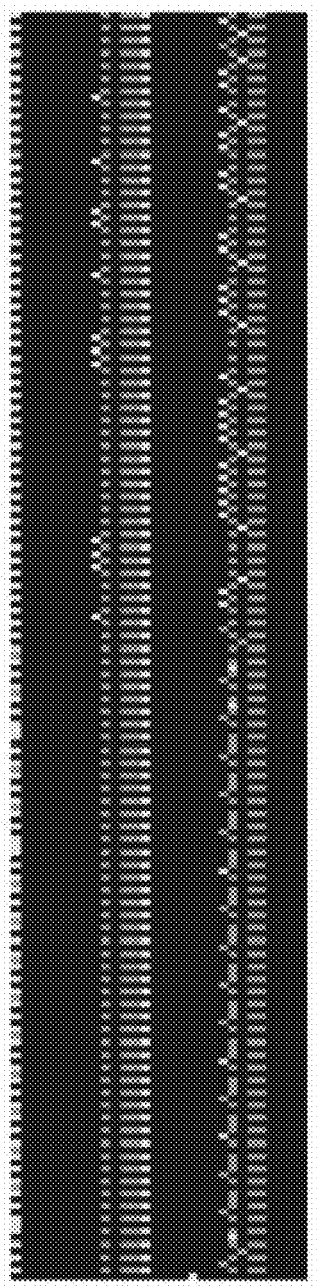

FIG. 10A illustrates an example of the case where a first pattern is formed from a use act of a user and the first patterns are arranged according to a time order to configure an image as illustrated in FIG. 8A, and FIG. 10B illustrates an example of the case where a second pattern formed from abusing relevant information about the user is inserted between the first patterns in the image to configure an image as illustrated in FIG. 8B.

Accordingly, in the method of detecting an abusing act according to the exemplary embodiment of the present invention, the abusing act is detected in consideration of the abusing relevant information about the user together, so that it is possible to more accurately detect the abusing act of the user.

In the abusing act detecting operation S130, whether the use act of the user is the abusing act is detected by using the image.

In this case, in the method of detecting the abusing act according to the exemplary embodiment of the present invention, whether the use act of the user is the abusing act is detected by inputting the image to a pre-trained neural network, so that it is possible to effectively detect the abusing act by analyzing the use acts frequently performed by the plurality of users.

In this case, as the pre-trained neural network, a Convolution Neural Network (CNN) is used, so that it is possible to effectively detect the abusing act by analyzing the plurality of images.

However, the present invention is not essentially limited thereto, and in addition to the CNN, a Recurrent Neural Network (RNN) or other neural networks may also be used, and additionally, in addition to the neural network, various methods of detecting the abusing act by analyzing the image may be applied.

Figure 11:
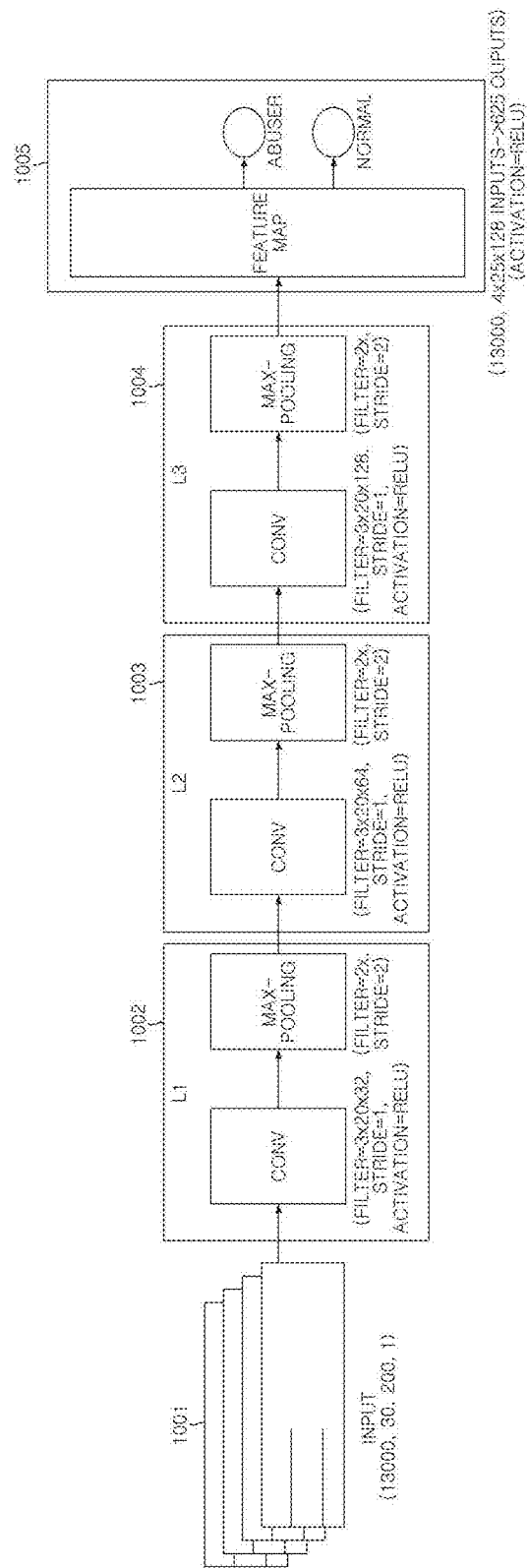
FIGS. 11 and 12 are diagrams illustrating a process of analyzing an image by using a neural network in the method of detecting the abusing act according to the exemplary embodiment of the present invention.

More particularly, FIG. 11 illustrates an example of the case where the abusing act is detected by analyzing an image by using the CNN in the method of detecting the abusing act in the online service according to the exemplary embodiment of the present invention.

In this case, as illustrated in FIG. 11, in the online service according to the exemplary embodiment of the present invention, the abusing act is detected by inputting the plurality of 30×200 images (see FIG. 9) into the CNN (reference numeral 1001 of FIG. 11).

In this case, the CNN may include three layers L1 1002, L2 1003, and L3 1004, and each layer passes a convolution function and then samples the layer through the max-pooling, and transfers the result of the sampling to a next layer.

Figure 12:
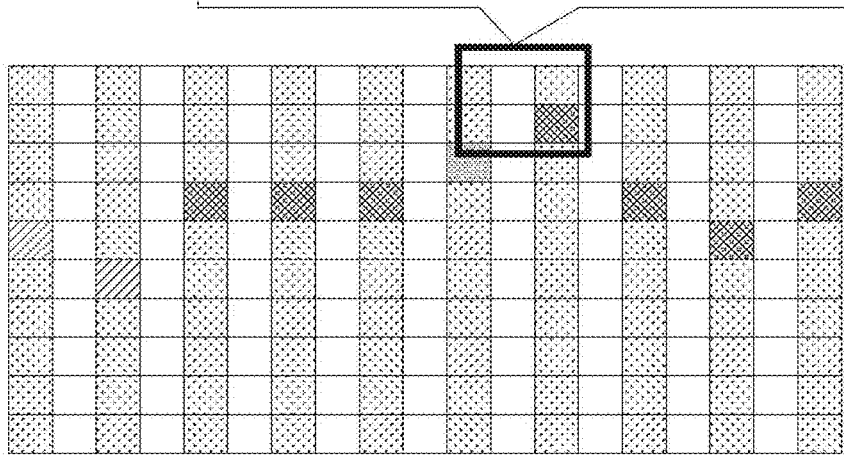

In this case, in the exemplary embodiment of the present invention, as illustrated in FIG. 12, when the pooling is performed in the CNN, the use information and the abusing relevant information about the user may be combined and processed, so that it is possible to more accurately detect the abusing act in consideration of both the use information and the abusing relevant information about the user.

In the method of detecting the abusing act in the online service according to the exemplary embodiment of the present invention, whether a predetermined abusing pattern is included in the image is determined by using the neural network, so that it is possible to more effectively detect whether the use act of the user is the abusing act.

Figure 13:
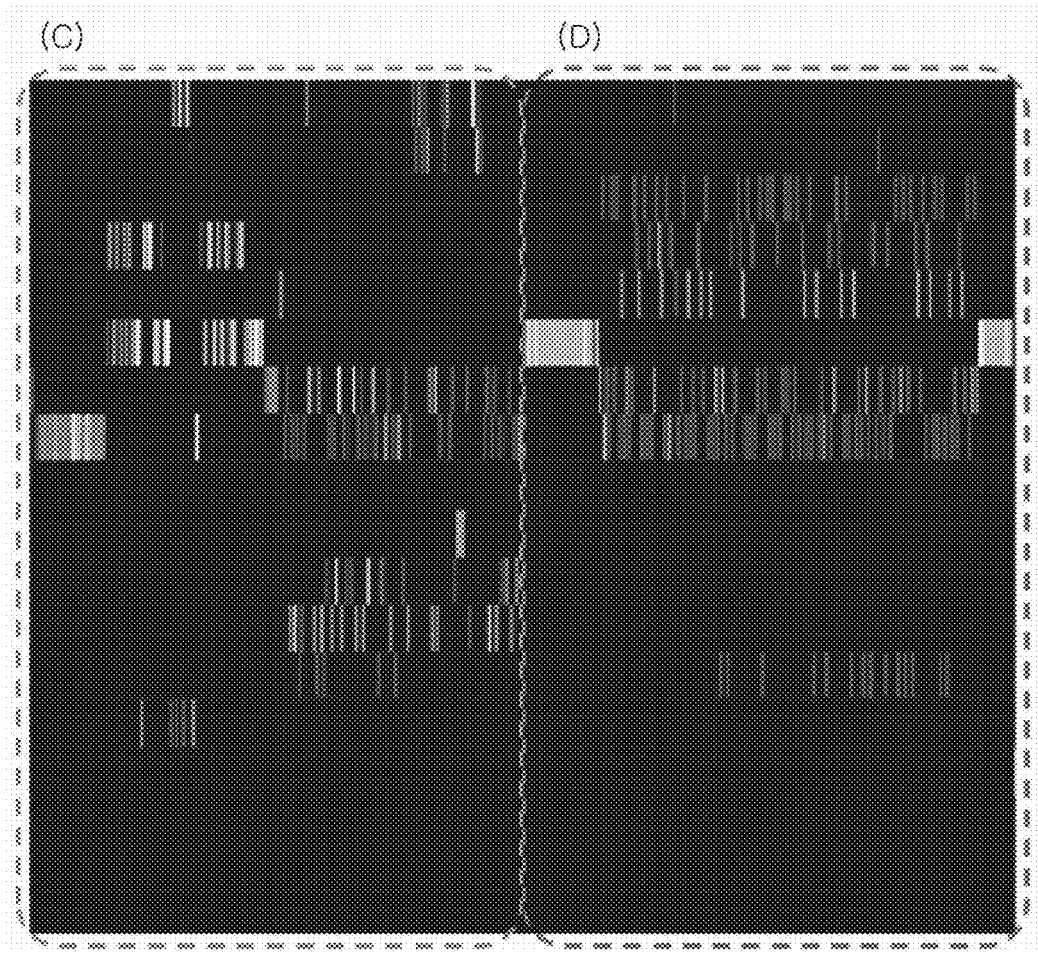
FIG. 13 is a diagram illustrating an example of an image, in which a normal act and an abusing act are mixed, in the method of detecting the abusing act according to the exemplary embodiment of the present invention.
Figure 14A:
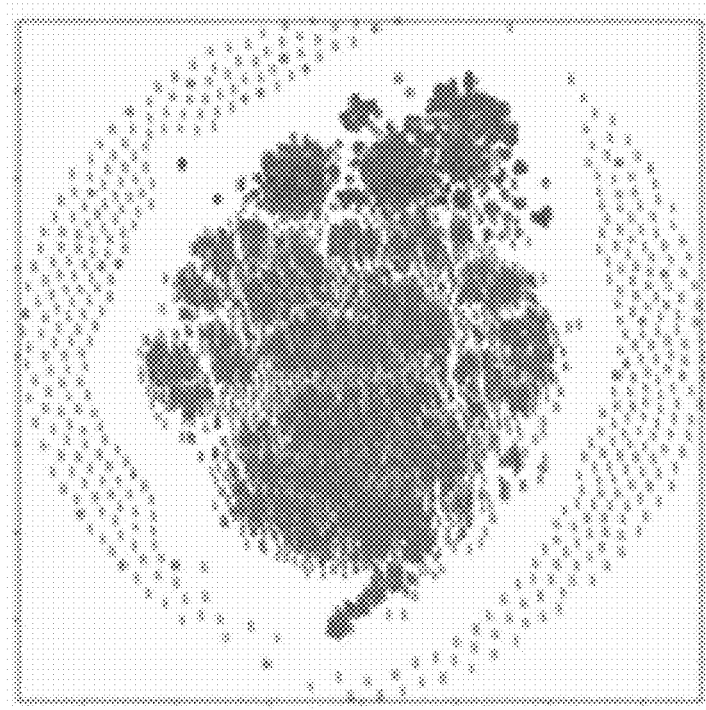
FIGS. 14A, 14B, 14C and 14D are diagrams illustrating an example of a case where a normal act and an abusing act are classified and grouped in the method of detecting the abusing act according to the exemplary embodiment of the present invention.
Figure 14B:
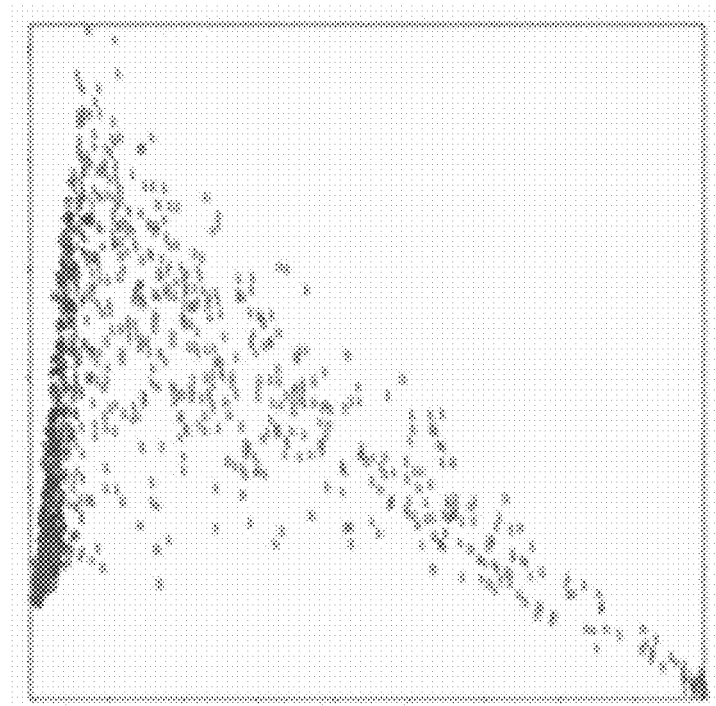
Figure 14C:
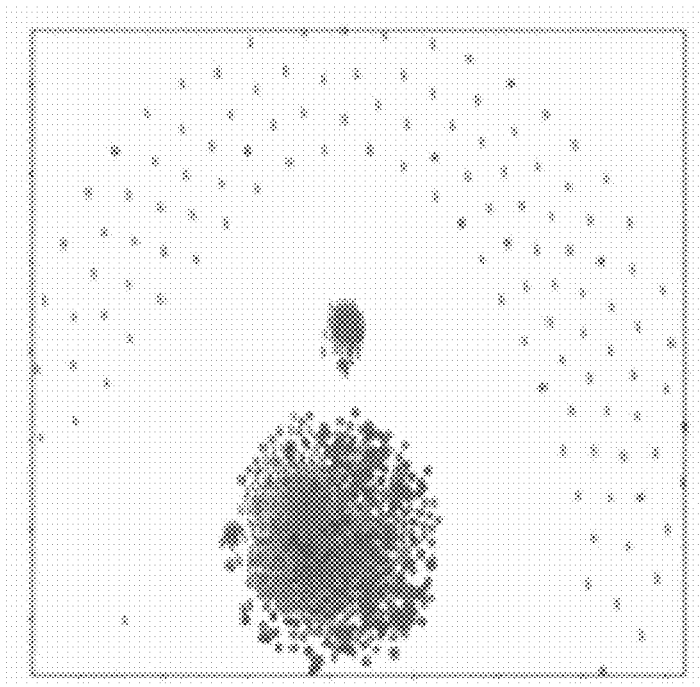
Figure 14D:
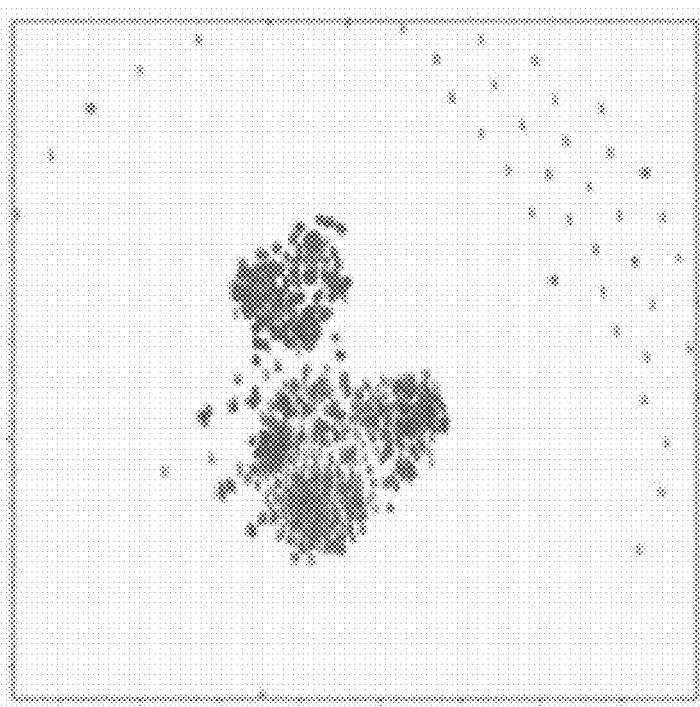

More particularly, in the case where an abuser performs an abusing act, such as an advertisement, by using his/her account, the entire image is configured with the abusing pattern as illustrated in FIGS. 7A and 7B, so that it may be easy to detect the abusing act, but in the case where an abuser performs an abusing act by stealing an account of another user and the like, a partial region of an image may be configured with a normal pattern (region (C) of FIG. 13) and another partial region (region (D) of FIG. 13) may also include an abusing pattern as illustrated in FIG. 13. More particularly, in region (C) of FIG. 13, because of the fact that there are irregular time intervals (various colors) between the use acts, the order of the acts is not uniform, and the kinds of use acts are various (various use acts including writing are performed) are considered, the use act of the user may be determined as a normal use act, not the abusing act for posting an advertisement and the like. But, in region (D) of FIG. 13, because of the fact that the time intervals between the use acts are uniform (uniform color), it is suspected to use a macro and the like, and further, because of the fact that a pattern is simply configured while work is performed mainly based on a specific use act for posting an advertisement and the like is considered, it may be determined that an abuser has stolen an account of a normal user and performed the abusing act.

Even for the foregoing case, in the method of detecting the abusing act in the online service according to the exemplary embodiment of the present invention, whether the abusing pattern is included in the image is determined by using the neural network, so that it is possible to more effectively detect whether the use act of the user is the abusing act.

Accordingly, in the method of detecting the abusing act in the online service according to the exemplary embodiment of the present invention, the neural network analyzes the input image and detects whether the use act performed by the user is the abusing act or a normal use act (reference numeral 1005 of FIG. 11).

FIGS. 14A, 14B, 14C and 14D illustrate graphs for the classification of the normal use act and the abusing act in the method of detecting the abusing act in the online service according to the exemplary embodiment of the present invention. In FIGS. 14A, 14B, 14C and 14D, a red color in output values output in the neural network represents the abusing act, and a green color represents a normal use act.

Accordingly, the neural network implemented through the training process for the plurality of training data detects whether the use act of the user is the abusing act or the normal use act based on the output value of the input image as illustrated in FIGS. 14A, 14B, 14C and 14D. Further, when the training data is insufficient, the training may also be performed by additionally securing the training data through clustering and the like.

FIG. 15 illustrates an example of analysis accuracy of the method of detecting the abusing act in the online service according to the exemplary embodiment of the present invention.

First, in FIG. 15, v1 of the X-axis represents the accuracy of a case where the abusing act is detected by configuring an image only with use act information about a user and learning through the CNN.

As can be seen in FIG. 15, in the case of v1, the abuser, such as an advertising agent, is detected with an accuracy of about 72%, and the normal user is detected with an accuracy of about 97%.

In FIG. 15, v2 represents the accuracy of a case where the abusing act is detected by configuring an optimized image by adjusting an arrangement, a color, and the like of the use act information and learning through the CNN.

Accordingly, in the case of v2, the accuracy of the detection of the abuser, such as the advertisement agent, is improved up to about 82%, and the accuracy of the detection of the normal user is maintained with about 97%.

In FIG. 15, v3 represents the accuracy of a case where the abusing act is detected by configuring an image by combining abusing relevant information of the user in addition to the use act information and learning through the CNN.

Accordingly, in the case of v3, the accuracy of the detection of the abuser, such as the advertisement agent, is improved up to about 87%, and the accuracy of the detection of the normal user is maintained with about 97%.

Regarding to the foregoing matter, in FIG. 15, v4 represents the accuracy of a case where the abusing act is detected by configuring an optimized image by adjusting an order of the abusing relevant information in v3 and adjusting a training variable, and learning through the CNN.

Accordingly, in the case of v4, the accuracy of the detection of the abuser, such as the advertisement agent, is improved by about up to 91%, and the accuracy of the detection of the normal user is also improved by about to 98%.

When a performance test result for v4 is summarized, as represented in the table below, it can be seen that both the abuser and the normal user may be detected with high accuracy.

TABLE 1

| Total accuracy | Accuracy | Recall | F1 score | Accuracy of abuser detection | Accuracy of normal user detection |
|---|---|---|---|---|---|
| 0.972 | 0.981 | 0.969 | 0.975 | 0.91 | 0.983 |

It is characterized that a computer program according to one aspect of the present invention combines each operation of the method of detecting the abusing act in the online service with hardware and executing the operation. The computer program may include a high-level language code executable in a computer by using an interpreter and the like, as well as a computer program including a machine language code made by a complier. In this case, the computer is not limited to a Personal Computer (PC), a notebook computer, and the like, and includes the whole information processing devices, such as a server, a smart phone, a table PC, a PDA, and a portable phone, which are provided with Central Processing Units (CPUs) and are capable of executing computer programs. Further, the computer program may be stored in a computer readable medium, and the medium includes the whole computer readable storage media, such as an electronic recording medium (for example, a ROM and a flash memory), a magnetic storage medium (for example, a floppy disk and a hard disk), an optical reading medium (for example, a CD-ROM and a DVD).

Figure 16:
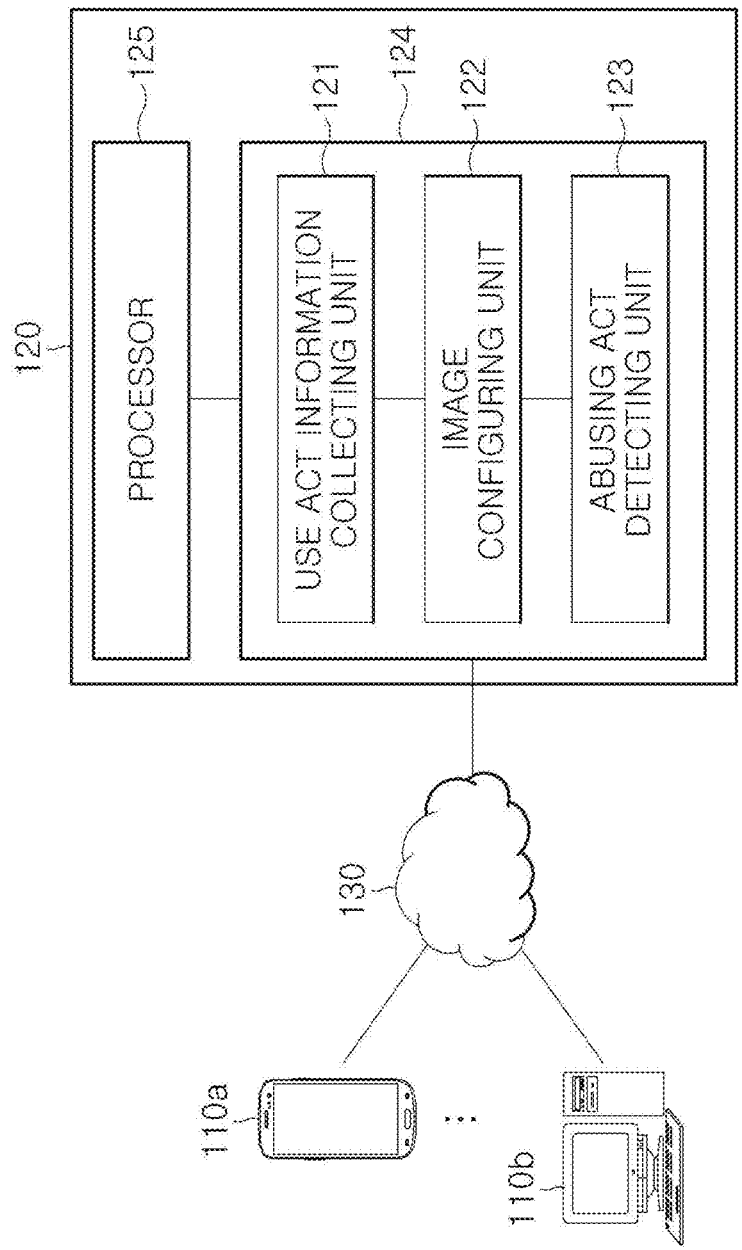
FIG. 16 is a diagram of an apparatus for detecting an abusing act according to an exemplary embodiment of the present invention.

FIG. 16 is a diagram of the apparatus 120 for detecting the abusing act in the online service according to the exemplary embodiment of the present invention.

As illustrated in FIG. 16, the apparatus 120 for detecting the abusing act in the online service according to the exemplary embodiment of the present invention may include a use act information collecting unit 121, an image configuring unit 122, and an abusing act detecting unit 123.

The apparatus 120 for detecting the abusing act according to the exemplary embodiment of the present invention may include a physical configuration, such as a processor 125 and a memory 124, and include one or more modules, built in the form of software program, which are configured to be executed by a processor 125, within the memory 124. Particularly, one or more modules may include the use act information collecting unit 121, the image configuring unit 122, the abusing act detecting unit 123, and the like.

The processor 125 may perform a function of executing various software programs, a command set stored in the memory 124, performing various functions, and processing data. A peripheral interface unit may connect input/output peripheral devices of a computer device to the processor 125 and the memory 124, and a memory controller may perform a function of controlling an access to the memory 124 when the processor 125 or the constituent element of the computer devices accesses the memory 124. According to the exemplary embodiment, the processor 125, the memory controller, and the peripheral interface unit may be implemented on a single chip or implemented with separate chips.

The memory 124 may include a non-volatile memory, such as a high-speed random access memory, one or more magnetic disk storage devices, and a flash memory device. Further, the memory 124 may further include a storage device located away from the processor, a network attached storage device accessed through a communication network, such as the internet, and the like.

The apparatus 120 for detecting the abusing act in the online service according to the exemplary embodiment of the present invention will be described below based on each constituent element. However, more particular contents for the apparatus 120 for detecting the abusing act in the online service according to the exemplary embodiment of the present invention may be inferred from the description for the method of detecting the abusing act in the online service according to the exemplary embodiment of the present invention, so that more detailed descriptions will be omitted below.

First, the use act information collecting unit 121 enables the processor 125 to collect use act information including the kinds and an order of one or more use acts performed by a user in a terminal.

The image configuring unit 122 enables the processor 125 to arrange the kinds of the one or more use acts performed by the user in a time order and configures an image by setting the kinds (N kinds) of predetermined use acts to a first axis and setting the order of the use acts to a second axis.

In this case, the image configuring unit 122 may enable the processor 125 to configure the image by setting a time interval of a corresponding use act from a just previous use act to a third axis.

The image configuring unit 122 enables the processor 125 to form abusing relevant information about the user in a pattern and add the pattern to the image.

Lastly, the abusing act detecting unit 123 enables the processor 125 to detect whether the use act of the user is an abusing act by using the image.

Figure 17:
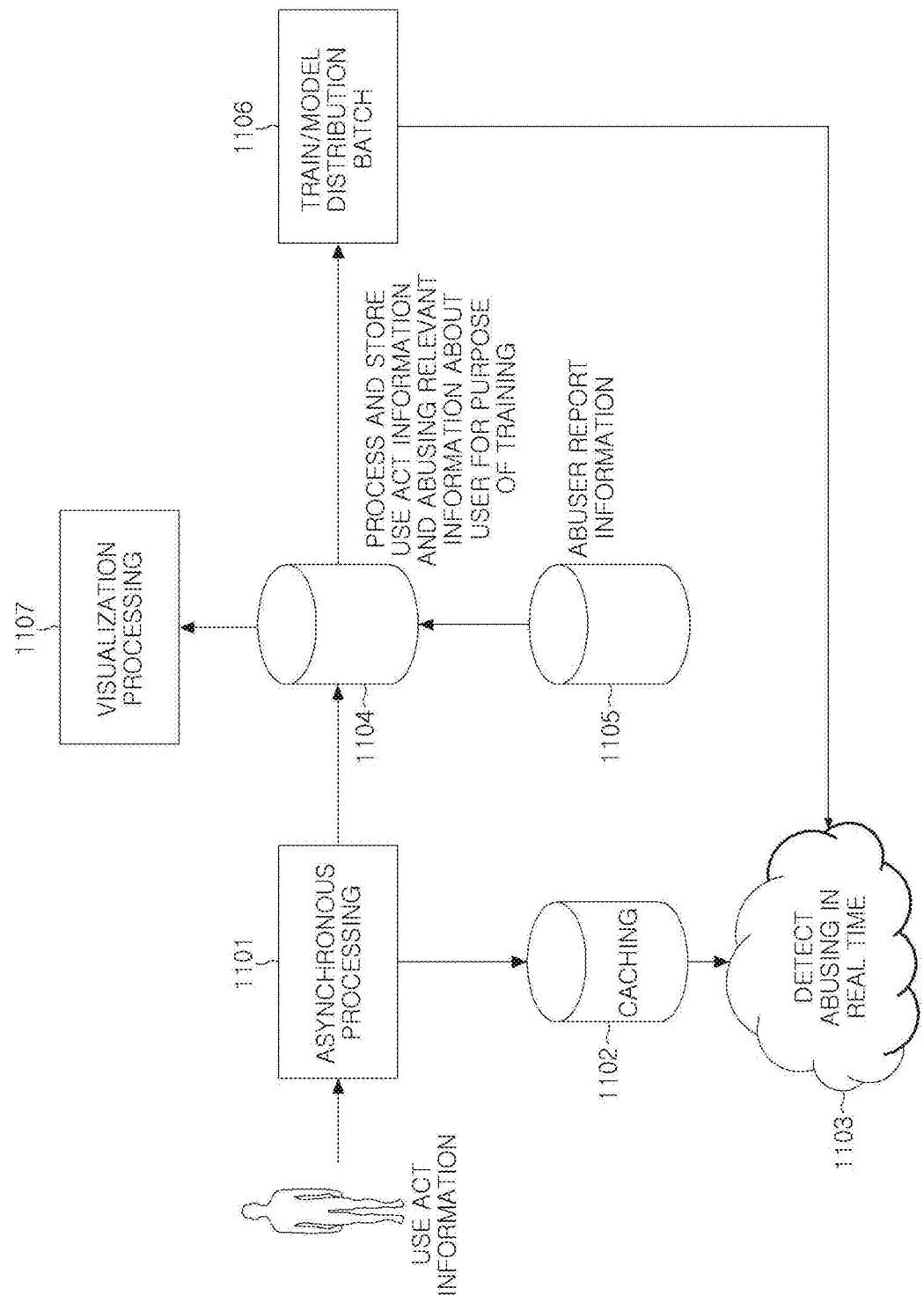
FIG. 17 is a diagram for describing an operation flow of the apparatus for detecting the abusing act according to the exemplary embodiment of the present invention.

FIG. 17 illustrates the operation of the apparatus 120 for detecting the abusing act in the online service according to the exemplary embodiment of the present invention in more detail.

As illustrated in FIG. 17, the apparatus 120 for detecting the abusing act in the online service according to the exemplary embodiment of the present invention first receives use act information about a user (or abusing relevant information about the user together with the use act information), caches the use act information in a data storage unit (reference numeral 1102 of FIG. 17) through asynchronous processing (reference numeral 1101 of FIG. 17), and then detects whether the use act of the user is an abusing act in real time (reference numeral 1103 of FIG. 17).

The apparatus 120 for detecting the abusing act in the online service according to the exemplary embodiment of the present invention processes and stores the use act information about the user (or the abusing relevant information about the user together with the use act information) for the purpose of training after the asynchronous processing (reference numeral 1104 of FIG. 17), and distributes a neural network model trained through a training process (reference numeral 1106 of FIG. 17), to apply the use act information to the detection whether the use act of the user is an abusing act.

In the processing of the use act information about the user (or the abusing relevant information about the user together with the use act information), abusing report information about another user may be reflected (reference numeral 1105 of FIG. 17), and the processed use act information about the user (or the abusing relevant information about the user together with the use act information) may also be provided to a manager and the like through visualization processing (reference numeral 1107 of FIG. 17).

Accordingly, the method, the apparatus, and the computer program for detecting the abusing act in the online service according to the exemplary embodiment of the present invention configure an image by forming the kinds and the order of use acts performed by a user using the online service in a pattern, analyze the image, and then determine whether the use act performed by the user is abnormal, so that it is possible to more accurately detect the abusing act of the user, and further, it is possible to effectively detect the abusing act by analyzing the use acts frequently performed by the plurality of users.

Although the exemplary embodiment of the present invention has been described for illustrative purposes, those skilled in the art will appreciate that various modifications, additions and substitutions are possible, without departing from the scope and spirit of the invention as disclosed in the accompanying claims. Accordingly, the exemplary embodiments described in the present invention do not intend to limit the technical spirit of the present invention, but intend to describe the technical spirit of the present invention, and the present invention is not limited by the exemplary embodiments. The scope of the present invention shall be interpreted by the accompanying claims, and all of the technical spirits within the equivalent range to the scope of the present invention shall be interpreted to be included in the scope of the present invention.

What is claimed is:

1. A method of detecting an abusing act of a user using an online service, the method comprising:
   a use act information collecting operation, executed by a processor, in which use act information is collected, including the kinds and an order of one or more use acts performed by a user;
   an image configuring operation, executed by the processor, in which the kinds of the one or more use acts performed by the user are arranged in a time order and an image is configured by setting the kinds (N kinds) of predetermined use acts to a first axis and setting the order of the use acts based on a time that each of the use acts occurred, to a second axis to form a pattern in the image; and an abusing act detecting operation, executed by the processor, in which detecting whether the use act of the user is an abusing act is done by using the pattern in the image.

2. The method of claim 1, wherein in the image configuration operation, the image is configured by setting a time interval of a corresponding use act from a just previous use act to a third axis.

3. The method of claim 2, wherein in the image configuration operation, the image is configured by forming the time interval from the just previous use act with a color of the corresponding use act.

4. The method of claim 1, wherein in the image configuration operation, abusing relevant information about the user is formed in a pattern and the pattern is added to the image.

5. The method of claim 4, wherein in the image configuration operation, the image is configured by forming a first pattern (N×1 pattern) from the use act of the user, arranging the first patterns in a time order to form an image, and inserting a second pattern (N×1 pattern) formed from abusing relevant information about the user between some or all of the plurality of first patterns of the image.

6. The method of claim 4, wherein in the image configuration operation, the image is configured by forming a third pattern (N×2 pattern) by attaching a second pattern (N×1 pattern) formed from the abusing relevant information to a first pattern (N×1 pattern) formed from the use act and arranging the third patterns in the order of the use acts.

7. The method of claim 1, wherein in the abusing act detecting operation, whether the use act of the user is the abusing act is detected by inputting the image to a pre-trained neural network.

8. The method of claim 7, wherein in the neural network, whether a predetermined abusing pattern is included in the image is determined and whether the use act of the user is the abusing use act is detected.

9. The method of claim 7, wherein the pre-trained neural network is a Convolution Neural Network (CNN).

10. A non-transitory computer readable recording medium storing a computer program which enables a processor to execute the method of detecting the abusing act of the user using the online service of claim 1.

11. An apparatus for detecting an abusing act of a user using an online service, the apparatus comprising:
    a memory storing a plurality of program modules; and
    a processor for executing the program modules stored in the memory;
    wherein the program modules include
    a use act information collecting unit configured to collect use act information including the kinds and an order of one or more use acts performed by a user in a terminal;
    an image configuring unit configured to arrange the kinds of the one or more use acts performed by the user in a time order and configure an image by setting the kinds (N kinds) of predetermined use acts to a first axis and setting the order of the use acts based on a time that each of the use acts occurred, to a second axis to form a pattern in the image; and
    an abusing act detecting unit configured to detect whether the use act of the user is an abusing act by using the pattern in the image.

12. The apparatus of claim 11, wherein the image configuring unit configures the image by setting a time interval of a corresponding use act from a just previous use act to a third axis.

* * * * *